(12) United States Patent
Kwon et al.

(10) Patent No.: US 11,400,793 B2
(45) Date of Patent: Aug. 2, 2022

(54) ELECTRIC HEATER FOR USE IN VEHICLE AND VEHICLE INCLUDING THE SAME

(71) Applicants: HYUNDAI MOTOR COMPANY, Seoul (KR); KIA MOTORS CORPORATION, Seoul (KR)

(72) Inventors: Dong Ho Kwon, Yongin-si (KR); Gee Young Shin, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 199 days.

(21) Appl. No.: 16/170,304

(22) Filed: Oct. 25, 2018

(65) Prior Publication Data

US 2020/0016956 A1 Jan. 16, 2020

(30) Foreign Application Priority Data

Jul. 11, 2018 (KR) .................. 10-2018-0080364

(51) Int. Cl.
*B60H 1/22* (2006.01)
*H05B 3/42* (2006.01)

(52) U.S. Cl.
CPC ......... *B60H 1/2225* (2013.01); *B60H 1/2218* (2013.01); *H05B 3/42* (2013.01); *B60H 2001/2281* (2013.01); *H05B 2203/02* (2013.01)

(58) Field of Classification Search
CPC .............. B60H 1/2225; B60H 1/2218; B60H 2001/2281; C25D 21/12; C25D 3/38; G01N 27/4166; G01N 27/42; F24H 2250/04; F24H 3/0435; F24H 9/1872; H05B 2203/02; H05B 2203/023; H05B 2203/037; H05B 3/42; H05B 3/50
USPC .................... 219/202, 483, 494, 504, 505
See application file for complete search history.

(56) References Cited

U.S. PATENT DOCUMENTS

| | | | |
|---|---|---|---|
| 5,471,034 A * | 11/1995 | Kawate | H05B 3/141 219/505 |
| 5,854,471 A * | 12/1998 | Tadokoro | H01C 7/10 219/505 |
| 7,098,426 B2 | 8/2006 | Bohlender et al. | |
| 7,667,164 B2 * | 2/2010 | Bohlender | F24H 9/1872 219/505 |
| 9,975,399 B2 * | 5/2018 | Khafagy | B60H 1/00764 |
| 10,244,582 B2 * | 3/2019 | Carenza | H05B 3/34 |
| 2011/0233189 A1 * | 9/2011 | Reiss | H05B 1/0236 219/492 |

(Continued)

FOREIGN PATENT DOCUMENTS

| | | |
|---|---|---|
| JP | 3812031 B2 | 8/2006 |
| KR | 10-1058979 A | 8/2011 |

(Continued)

*Primary Examiner* — Tu B Hoang
*Assistant Examiner* — Vy T Nguyen
(74) *Attorney, Agent, or Firm* — Lempia Summerfield Katz LLC (57) ABSTRACT

An electric heater for a vehicle includes a heat dissipation fin for heat-exchange with air, a ceramic element to emit heat by receiving a power-supply voltage, and a housing to support the heat dissipation fin and the ceramic element. The ceramic element includes a first positive temperature coefficient (PTC) element, and a second PTC element having a heating power greater than a heating power of the first PTC element.

11 Claims, 11 Drawing Sheets

(56) References Cited

U.S. PATENT DOCUMENTS

2017/0113511 A1\* 4/2017 Khafagy ............ B60H 1/00042
2017/0339748 A1\* 11/2017 Carenza ............... H05B 1/0238

FOREIGN PATENT DOCUMENTS

KR          101058979 B1 \*  8/2011
KR          10-1508569 A    3/2015

\* cited by examiner

ELECTRIC HEATER FOR USE IN VEHICLE AND VEHICLE INCLUDING THE SAME

CROSS-REFERENCE TO RELATED APPLICATION

This application claims priority to and the benefit of Korean Patent Application No. 10-2018-0080364, filed on Jul. 11, 2018, the entire contents of which are incorporated herein by reference in its entirety.

FIELD

Forms of the present disclosure relate to an electric heater included in a heating, ventilation, and air conditioning (HVAC) device and a vehicle including the same.

BACKGROUND

The statements in this section merely provide background information related to the present disclosure and may not constitute prior art.

In general, an air-conditioning device for use in a vehicle may include a cooling system to cool an indoor space of the vehicle and a heating system to heat an indoor space of the vehicle.

In more detail, the cooling system compresses refrigerant using a compressor driven by engine power, controls the compressor to transmit the compressed refrigerant to a condenser, controls the condenser to condense the refrigerant using forced air ventilation of a cooling fan, controls the condensed refrigerant to sequentially pass through a receiver drier, an expansion valve, and an evaporator, and controls the resultant refrigerant to move back to the compressor. In this case, air circulated by a blower fan of a blower unit installed at an inlet of an air-conditioner case exchanges heat with the refrigerant passing through the evaporator, and the heat-exchanged cool air is discharged into the indoor space of the vehicle, such that air in the indoor space of the vehicle can be cooled.

Meanwhile, when the heating system controls engine coolant to move back to the engine through a heater core, the heating system controls air blown by the blower fan of the blower unit to exchange heat with coolant passing through the heater core, and controls the heat-exchanged warm air to be discharged into the indoor space of the vehicle, such that the heating system air can heat air in the indoor space of the vehicle.

Specifically, the heating system is designed to heat the indoor space of the vehicle under the condition that the engine is driven and coolant flowing around the engine is sufficiently heated. However, since the engine and the coolant before engine ignition are generally kept in sub-zero temperatures in winter, a long period of time is consumed until the engine temperature increases to a predetermined temperature or higher, such that it is impossible for the heating system to supply warm air to the indoor space of the vehicle during an initial driving stage after engine ignition.

Therefore, in order to heat the indoor space of the vehicle even in the initial driving stage after engine ignition, an electric heater using a Positive Temperature Coefficient (PTC) element having positive temperature characteristics in which resistance of the PTC element increases in proportion to increasing temperature has recently been developed.

The electric heater based on the PTC element is arranged close to a typical heater core mounted in the air-conditioner case and directly heats air, such that the electric heater can increase air temperature of the indoor space of the vehicle in the range from an initial driving stage of the engine to a normal driving stage of the engine.

U.S. Pat. No. 7,667,164 relating to a conventional electric heater for a vehicle has disclosed a technology for implementing a low-power (high resistance) element having lower power and higher resistance than a standard PTC element so as to offset or compensate for an error that has a higher possibility of occurring in a fabrication process of the standard PTC element, such that the lower-power (higher resistance) element is provided in the electric heater.

However, we have discovered that the above-mentioned conventional art has disadvantages in that a maximum capacity (i.e., a maximum temperature) of the electric heater is restricted due to a thermal melting point of an air-conditioner case, and it is almost impossible to increase a heating temperature of the PTC element although an in-vehicle heating system needs to be additionally heated. That is, the amount of power of the electric heater is decided by a given region of the electric heater.

SUMMARY

The present disclosure provides an electric heater for a vehicle (also called an in-vehicle electric heater) for changing categories and arrangement of PTC elements in various ways, generating a maximum amount of power (i.e., increase in heating temperature) within a restricted heating region of the electric heater, and reducing production costs of the electric heater by reducing the number of standard PTC elements, and a vehicle including the same.

Additional aspects of the present disclosure will be set forth in part in the description which follows and, in part, will be obvious from the description, or may be learned by practice of the present disclosure.

In accordance with an aspect of the present disclosure, an electric heater for a vehicle includes: a heat dissipation fin configured to exchange heat with air, at least one ceramic element configured to emit heat by receiving a power-supply voltage, and a housing configured to support the heat dissipation fin and the ceramic element. The at least one ceramic element includes a first positive temperature coefficient (PTC) element, and a second PTC element having a higher amount of heating power than a heating power of the first PTC element.

The ceramic element may include the first PTC element disposed at an outer side of the housing, and the second PTC element disposed at an inner side of the housing.

The at least one ceramic element may include a plurality of ceramic elements in which different PTC elements are arranged. The first ceramic element of the plurality of ceramic elements may include only the first PTC element, and the second ceramic element of the plurality of ceramic elements includes the first PTC element and the second PTC element.

Each of the first PTC element and the second PTC element may have a heating operation temperature that is changeable according to an amount of the air (i.e., air volume).

The at least one ceramic element may include a plurality of the first PTC elements and a plurality of the second PTC elements.

The second PTC element may have a low resistance value changeable at approximately 25° C. less than a low resistance value of the first PTC element.

In accordance with another aspect of the present disclosure, a vehicle includes a body, and an electric heater for a vehicle to heat air of an indoor space of the body. The electric heater for the vehicle may include a heat dissipation fin configured for heat-exchange with air, at least one ceramic element configured to emit heat by receiving a power-supply voltage, and a housing configured to support the heat dissipation fin and the at least one ceramic element. The ceramic element may include a first positive temperature coefficient (PTC) element, and a second PTC element having a higher amount of heating power than a heating power of the first PTC element.

The at least one ceramic element may include the first PTC element disposed at an outer side of the housing, and the second PTC element disposed at an inner side of the housing.

The at least one ceramic element may include a plurality of ceramic elements provided at a bottom surface of the heat dissipation fin and supported by the housing.

The first ceramic element of the plurality of ceramic elements may include only the first PTC element, and the second ceramic element of the plurality of ceramic elements may include the first PTC element and the second PTC element that are spaced apart from each other by a predetermined distance.

Each of the first PTC element and the second PTC element may have a heating operation temperature that is changeable according to an amount of the air (i.e., air volume).

The at least one ceramic element may include a plurality of the first PTC elements and a plurality of the second PTC elements.

The second PTC element may have a low resistance value changeable at approximately 25° C. less than a low resistance value of the first PTC element.

The vehicle may further include an evaporator to allow the air of the indoor space of the body to exchange heat with a refrigerant, and a heater core to heat air cooled by the evaporator using a coolant of an engine.

The vehicle may further include an outlet through which air heated by the electric heater is discharged into the indoor space of the body.

The vehicle may further include a rod tube disposed at a bottom surface of the first heat dissipation fin, an insulation material configured to insulate a rod tube and a terminal plate, and a guide configured to fix a position of the terminal plate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the forms of the present disclosure, examples of which are illustrated in the accompanying drawings. It should be noted that the specification of the present disclosure does not describe all the constituent elements of the forms, and general matters well known to those skilled in the art and redundant matters of the forms will not be described herein for clarity.

Throughout the present disclosure, terms "..part", "..module", "..member", "..block", and the like mean an element capable of being implemented by hardware, software, or a combination thereof. As used in the specification and appended claims, the term "..parts", "..modules", "..members", or "..blocks" may be implemented by a single constituent element, or the term "..part", "..module", "..member", or "..block" may include a plurality of constituent elements.

Throughout the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the present disclosure, if it is assumed that a certain part includes a certain component, the term "comprising or including" means that a corresponding component may further include other components unless context clearly indicates otherwise.

In description of the present disclosure, the terms "first" and "second" may be used to describe various components, but the components are not limited by the terms. These terms may be used to distinguish one component from another component. For example, a first component may be called a second component and a second component may be called a first component without departing from the scope of the present disclosure. The term "and/or" may include a combination of a plurality of items or any one of a plurality of items.

The terms "a", "an", "one", "the" and other similar terms include both singular and plural forms, unless context clearly dictates otherwise.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The principles of the present disclosure and the forms of the present disclosure will hereinafter be given with reference to the attached drawings. An electric heater for a vehicle according to forms of the present disclosure will hereinafter be given with reference to the attached drawings.

Figure 1:
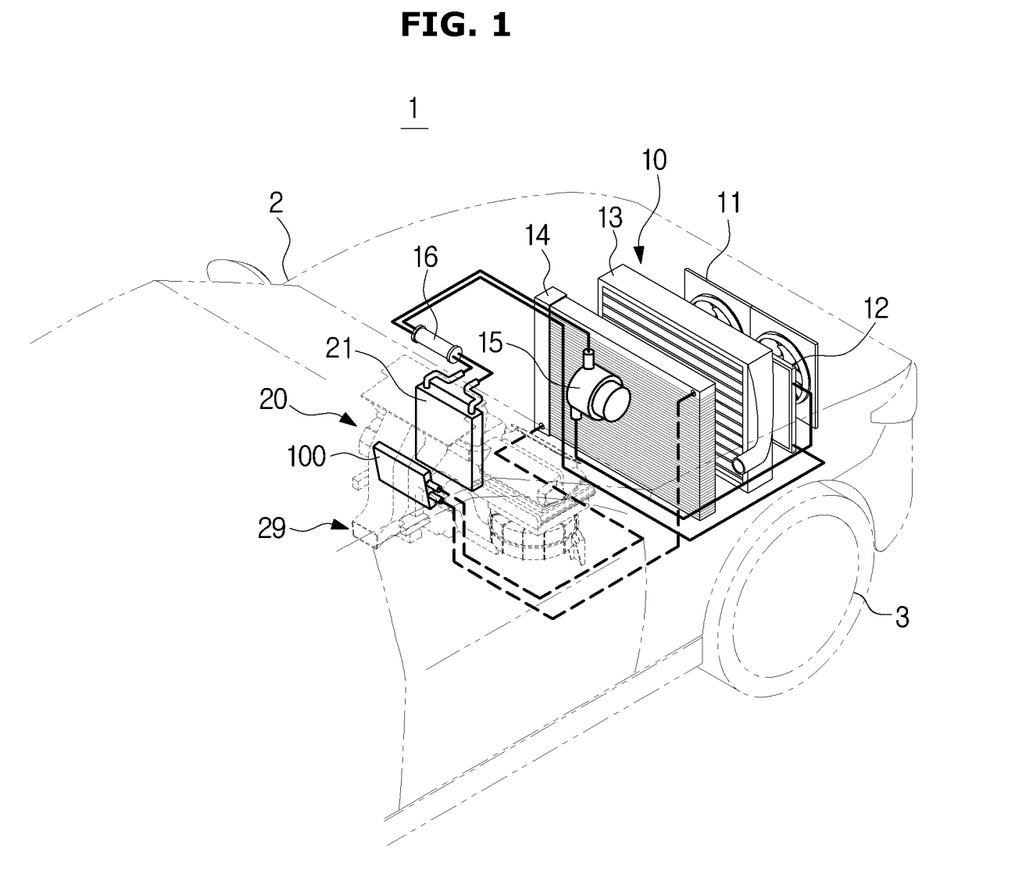
FIG. 1 is a view illustrating an air-conditioner embedded in a vehicle in one form of the present disclosure.

FIG. 1 is a view illustrating an air-conditioner embedded in a vehicle 1 according to an exemplary form of the present disclosure.

Referring to FIG. 1, the vehicle 1 may include: a body 2 forming the appearance of the vehicle 1, wheels 3 to move the vehicle 1 from place to place, a drive device (not shown) to rotate the wheels 3, and a steering wheel (not shown) to control the wheels 3.

In more detail, the drive device may provide rotational force to the wheels 3 in a manner that the body 2 moves forward or backward. The drive device may include an engine to generate rotational force by burning fossil fuels or a motor to generate rotational force upon receiving power from a battery (not shown).

Meanwhile, the vehicle 1 may include not only the drive device but also an air-conditioning device 10 to perform air-conditioning of the indoor space of the vehicle 1. A user who sits on seats or the like of the indoor space of the body 2 may view an air outlet 29 through which air is discharged, an input button (not shown), etc. However, the air-conditioning device 10 may include various constituent elements for air-conditioning.

In more detail, the air-conditioning device 10 may include an inlet part 11 located at the front of the body 2 to suction outdoor air of the vehicle 1, a filter part 12 to filter out dirt or dust from the air, a condenser 13 to cool high-temperature refrigerant using outdoor air so as to liquefy the refrigerant, a radiator 14 to emit some parts of generated heat to the outside through coolant, a compressor 15 to increase pressure by circulating and compressing the refrigerant, a receiver 16 to store the refrigerant as well as to separate air bubbles from the refrigerant, and an evaporator 21 to convert a liquid refrigerant received from an expansion valve (not shown) into a low-temperature low-pressure refrigerant as well as to cool air of an indoor space of the body 2 through heat-exchange between the refrigerant and the air.

Meanwhile, as shown in FIG. 1, the evaporator 21 may be provided at the back side of a center console (also called a center fascia) provided in the indoor space of the vehicle 1 in which a driver or passenger rides.

The air-conditioning device 10 may further include a Heating, Ventilation, and Air Conditioning (HVAC) device to control air temperature of the indoor space of the vehicle in which the user rides as well as to control the evaporator 21.

Figure 2:
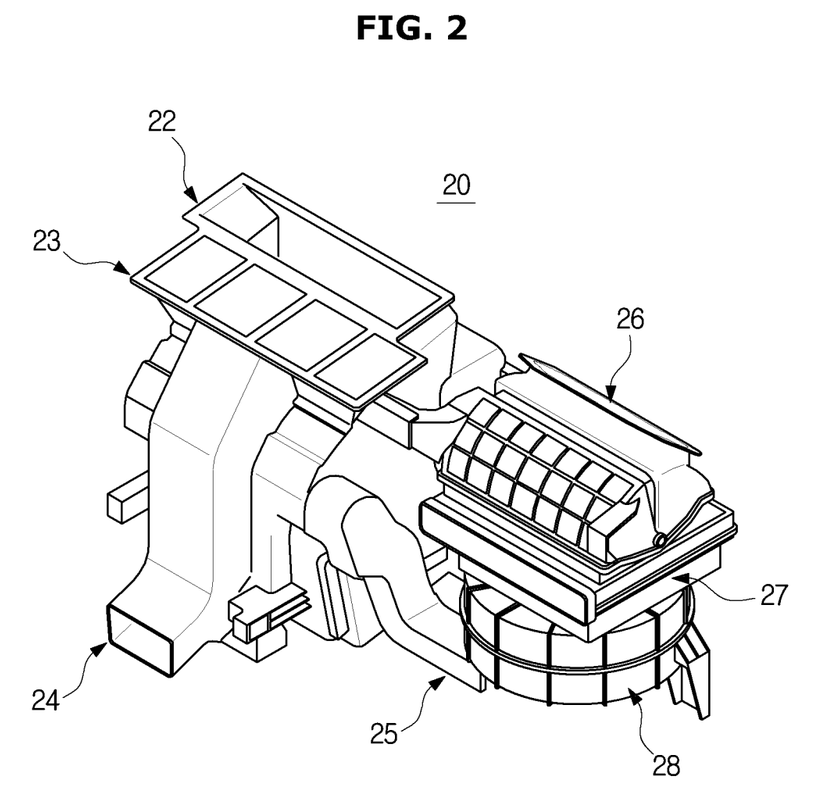
FIG. 2 is a view illustrating a heating, ventilation, and air conditioning (HVAC) device in one form of the present disclosure.
Figure 3:
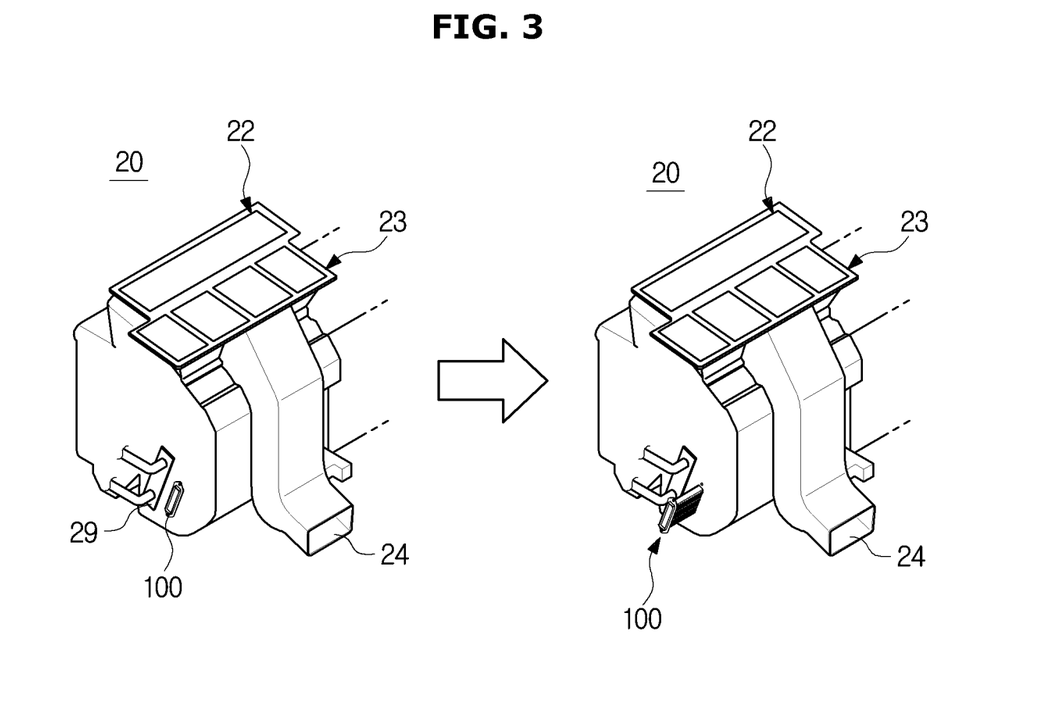
FIG. 3 is a view illustrating a PTC heater in one form of the present disclosure.

FIG. 2 is a view illustrating the (HVAC) device 20 in one form of the present disclosure. FIG. 3 is a view illustrating a PTC heater according to an exemplary form of the present disclosure. Hereinafter, FIGS. 2 and 3 will be described to avoid redundant description thereof.

Referring to FIG. 2, from the viewpoint of a driver seat, the HVAC device 20 may include a first outlet 22, a second outlet 23, a third outlet 24, a fourth outlet 25, a duct 26, an antibacterial filter 27, a motor 28, and the evaporator 21. The first outlet 22 is formed to discharge air toward a windshield of the body 2. The second outlet 23 is formed to discharge air toward a chest of a driver or passenger. The third outlet 24 is formed to discharge air toward back seats of the vehicle through a pipe. The fourth outlet 25 is formed to discharge air toward feet of a user who sits on a driver seat or passenger seat. The duct 26 is formed to receive indoor air of the indoor space of the body 2. The antibacterial filter 27 is formed to filter out dirt or dust from the received indoor air. The motor 28 and the evaporator 21 are formed to control flow of the indoor air.

As shown in FIG. 1, the evaporator 21 is connected to the duct 26 such that air is cooled. In more detail, indoor air suctioned through the duct 26 may pass through the antibacterial filter 27 by operation of the motor 28, and may then flow into the evaporator 21.

Referring to FIG. 3, air having passed through the evaporator 21 may arrive at a heater core 29. The heater core 29 may heat (or warm) the air using engine coolant. A temperature of the coolant heated by the engine may increase due to the heater core 29.

That is, the HVAC device 20 may adjust the amount of air that is cooled by the evaporator 21 and then passes through the heater core 29, such that the HVAC device 20 can finally adjust air temperature.

Meanwhile, since a speed for increasing air temperature for the heating mode in the vehicle 1 provided with a diesel engine is slower than a speed for increasing air temperature for the heating mode in a vehicle provided with a gasoline engine, the HVAC device 20 may further include not only the heater core 29 but also the electric heater (i.e., a PTC heater) 100.

Since an electric vehicle does not include an engine compartment, the electric vehicle is generally designed to use the PTC heater 100 as a main heating system.

Before a temperature of the coolant reaches a predetermined temperature, the PTC heater 100 may electrically emit heat, such that the PTC heater 100 can heat air.

Figure 4:
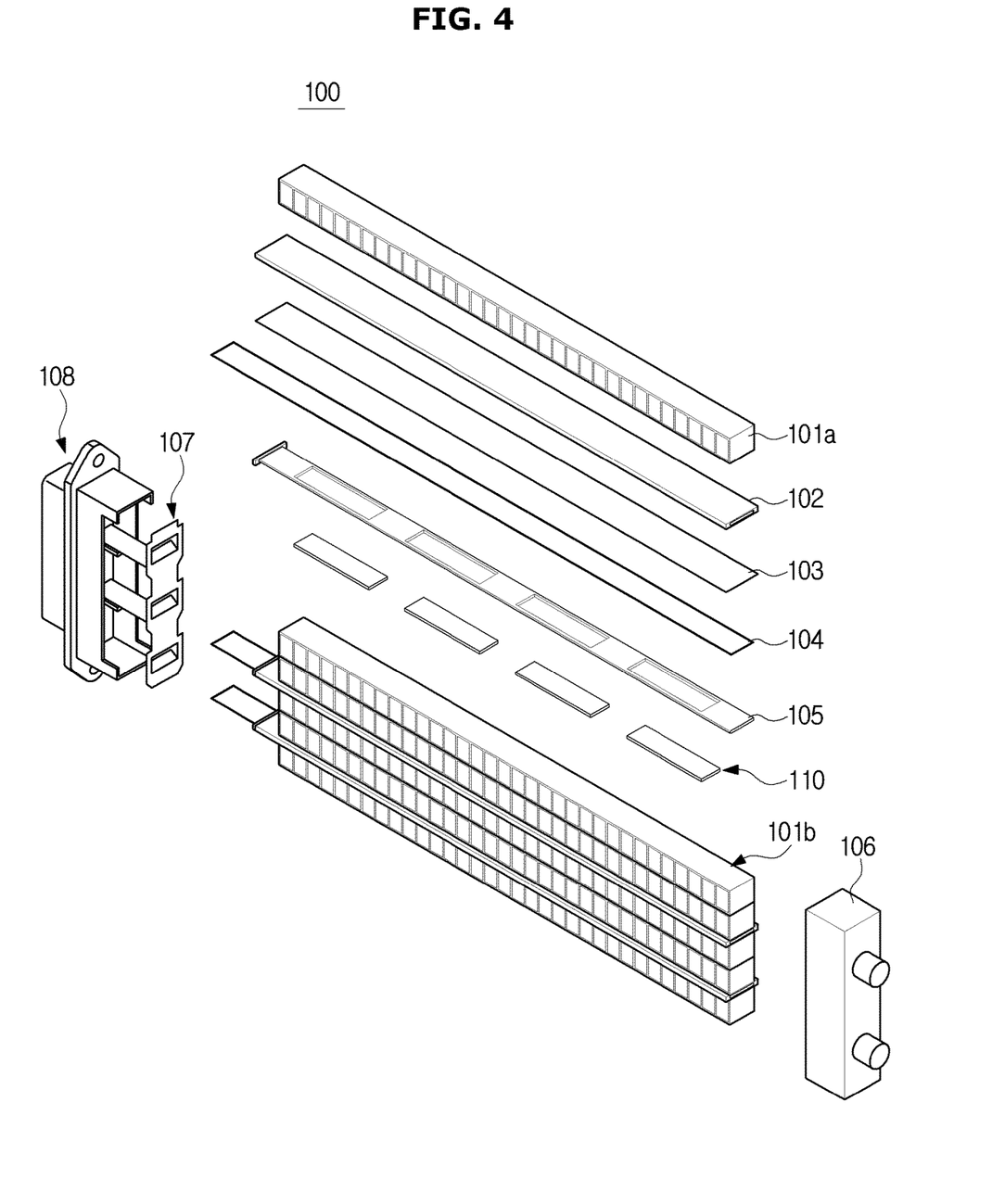
FIG. 4 is an exploded perspective view illustrating a PTC heater in one form of the present disclosure.

FIG. 4 is an exploded perspective view illustrating the PTC heater according to an exemplary form of the present disclosure.

Referring to FIG. 4, the PTC heater 100 may include: a heat dissipation fin 101a to be used for heat-exchange with air, a rod tube 102 to act as a ground power supply, an insulating material 103 to insulate positive(+) power, a terminal plate 104 corresponding to a positive(+) power supply, a guide 105 to fix a position of the terminal plate 104, a heating element 110 (hereinafter referred to as a ceramic element) corresponding to a heat source, a second heat dissipation fin 101b to be used for heat-exchange with air, a rear housing 106 to support constituent elements of the PTC heater 100, a ground terminal 107 connected to a ground voltage, a connector connected to the ground terminal 107, and a front housing 108 to support constituent elements of the PTC element 100 along with the rear housing 106.

In this case, the ceramic element 110 corresponding to a heat source may include a plurality of heating elements formed of, for example, barium titanate (BaTiO3).

Meanwhile, the heating elements of the ceramic element 110 for use in the conventional PTC heater may include only at least one element, an operating temperature of which is changed according to the amount of air applied to the PTC heater 100, or may further include a low-power (high-resistance) PTC element.

However, each of the PTC elements arranged in the ceramic element 110 in one form of the present disclosure has a low resistance value ($R_{25}$) changeable at approximately 25° C., and the PTC elements each having a low resistance value ($R_{25}$) are arranged with at least one standard PTC element. As a result, the degree of additional heating is increased in the HVAC device 20, and at the same time the number of standard PTC elements is reduced, such that production costs of the PTC heater can be greatly reduced.

Figure 5:
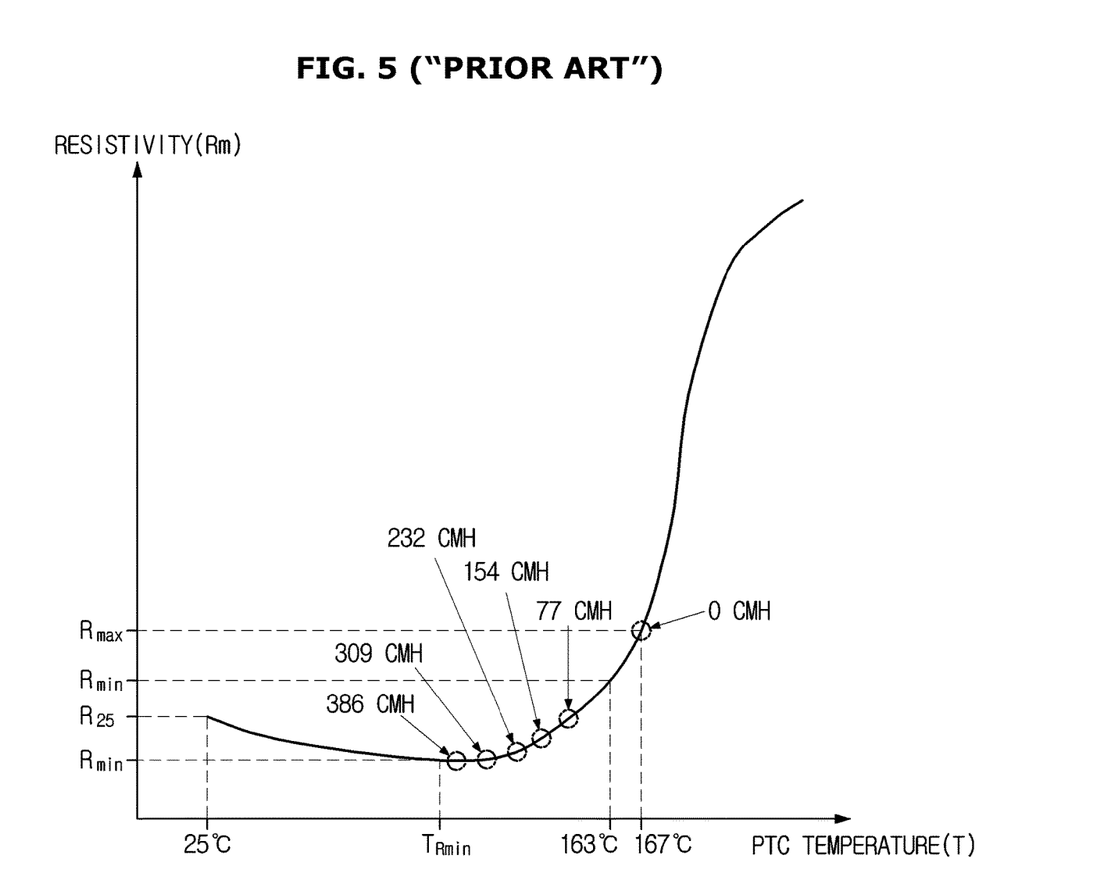
FIG. 5 is a graph illustrating characteristics of a conventional standard PTC element.
Figure 6:
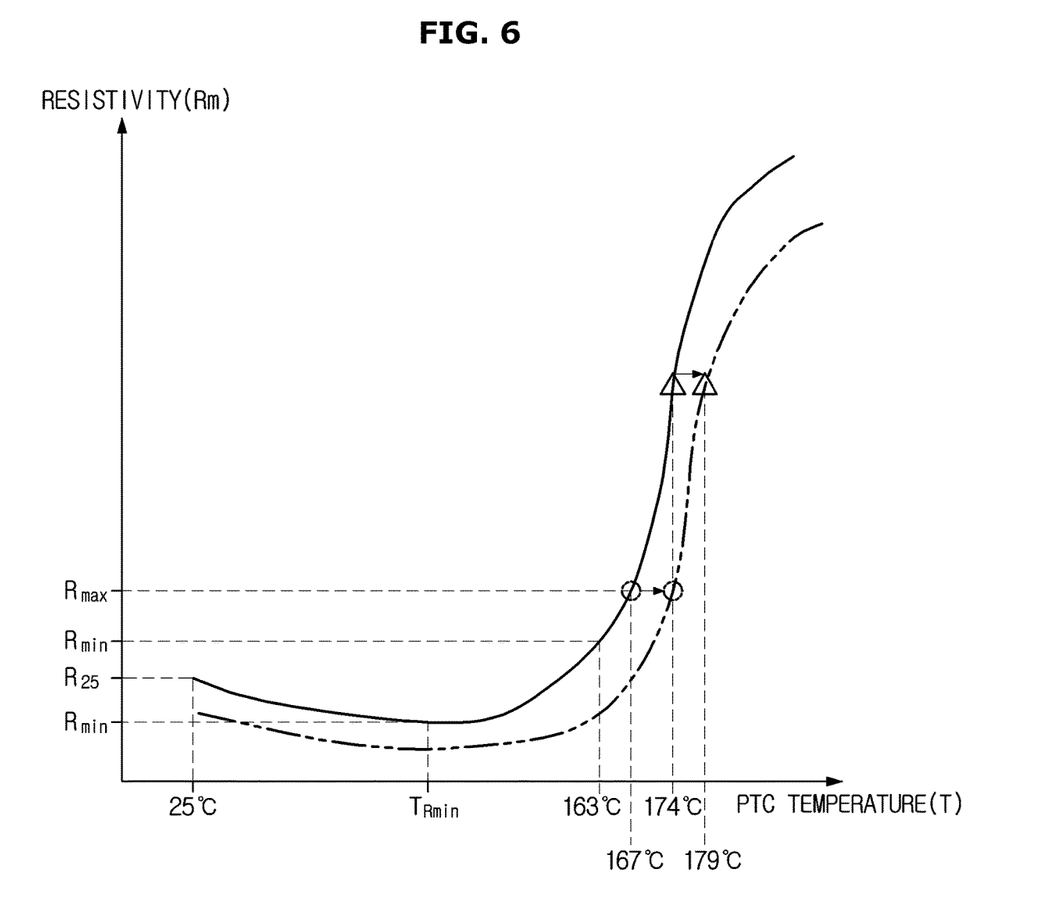
FIG. 6 is a graph illustrating characteristics of a PTC element in one form of the present disclosure.

FIG. 5 is a graph illustrating characteristics of a conventional standard PTC element. FIG. 6 is a graph illustrating characteristics of the PTC element according to an exemplary form of the present disclosure. Hereinafter, FIGS. 5 and 6 will be described to avoid redundant description thereof.

In the graphs of FIGS. 5 and 6, an X-axis may denote a Celsius temperature of a PTC element (i.e., a heating element), and a Y-axis may denote resistivity in Rm. According to an evaluation condition of the graph of FIG. 5, an input voltage is set to 13.5 V, and a temperature of peripheral air of the case of the HVAC device 10 is set to approximately 0° C.

A general PTC element, i.e., a standard PTC element 111, may have the same characteristics as in FIG. 5, and an operating temperature and associated resistivity characteristics of the PTC element may be changed according to air volume applied to the standard PTC element.

In more detail, as air volume is variably changed from approximately 0 CHM (Cubic Meters per Hour in flow rate, m3/hr) to 386 CHM, the operating temperature (T) of the standard PTC element 111 is also variably changed from $TR_{min}$ to 167° C.

The ceramic element 110 may include not only the standard PTC element (hereinafter referred to as a first PTC element) 111 but also a second PTC element 112 having characteristics shown in the graph of FIG. 6.

In more detail, in a specific condition in which a temperature of peripheral air of the HVAC device 20 is approximately 85° C., an input voltage is approximately 16V, and an air volume is equal to or less than approximately 0 CHM, a heating temperature of the first PTC element 111 is about 174° C.

Although the operating temperature of the second PTC element 112 is changeable according to air volume in the same manner as in the first PTC element 111, the second PTC element 112 may include a specific material, a heating temperature of which is equal to or higher than approximately 175° C. in a specific condition in which a temperature of peripheral air of the HVAC device 20 is approximately 85° C., an input voltage is approximately 16V, and an air volume is equal to or less than approximately 0 CHM, as shown in FIG. 6.

Therefore, although the second PTC element 112 may have the same resistivity value as that of the first PTC element 111, the second PTC element 112 may emit heat of approximately 175° C. or higher.

In addition, the HVAC device 20 and a structure thereof may have a high possibility of being melted when a temperature of peripheral air of the HVAC case is equal to or higher than approximately 175° C., the HVAC device 20 according to the form may increase a heating temperature using the second PTC element 112 when additional heating for the HVAC device 20 is needed. In addition, although the HVAC device 20 includes the second PTC element 112, it should be noted that the PTC heater 100 is not destroyed.

Figure 7:
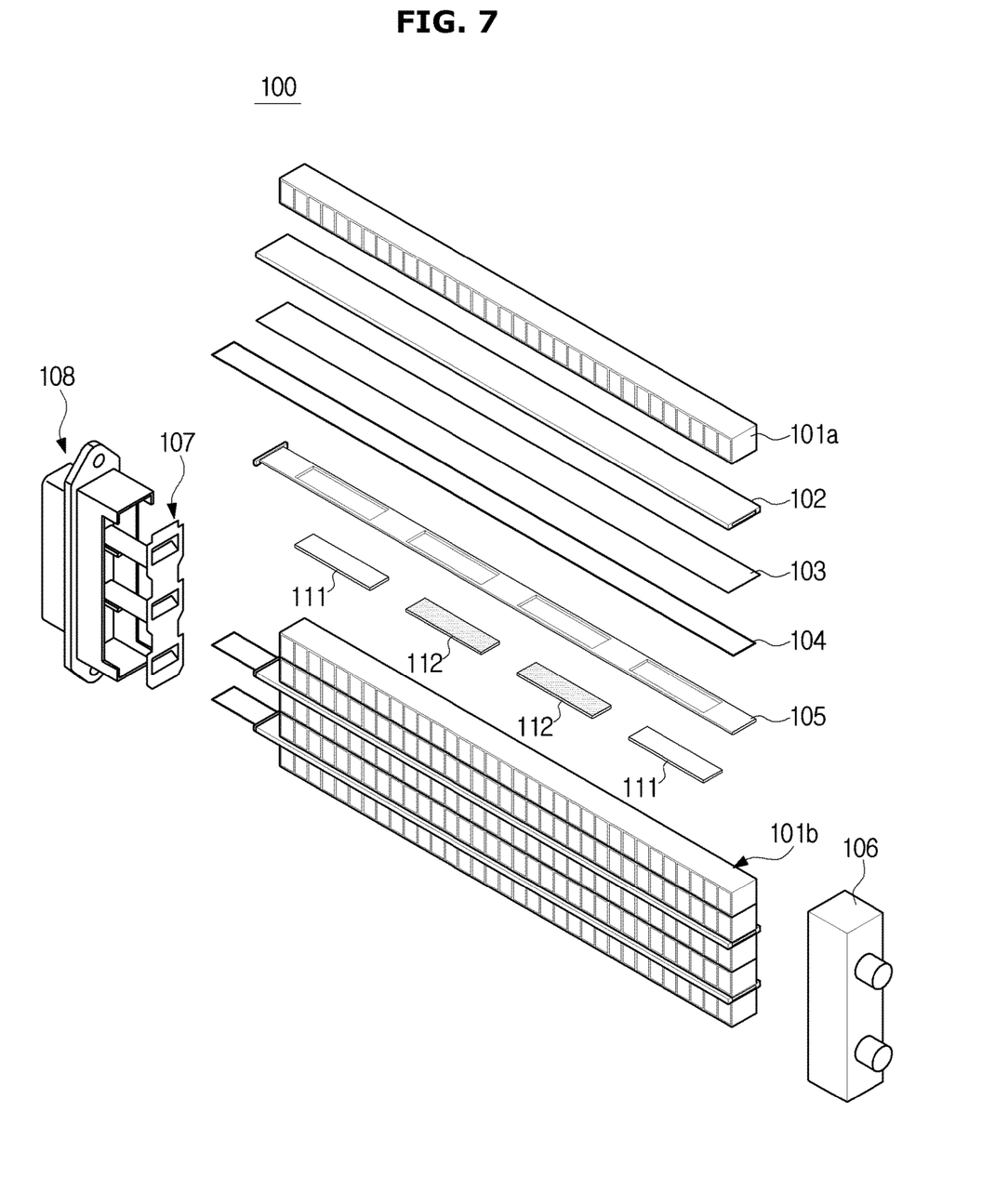
FIG. 7 is an exploded perspective view illustrating arrangement of PTC elements in a ceramic element in one form of the present disclosure.
Figure 8:
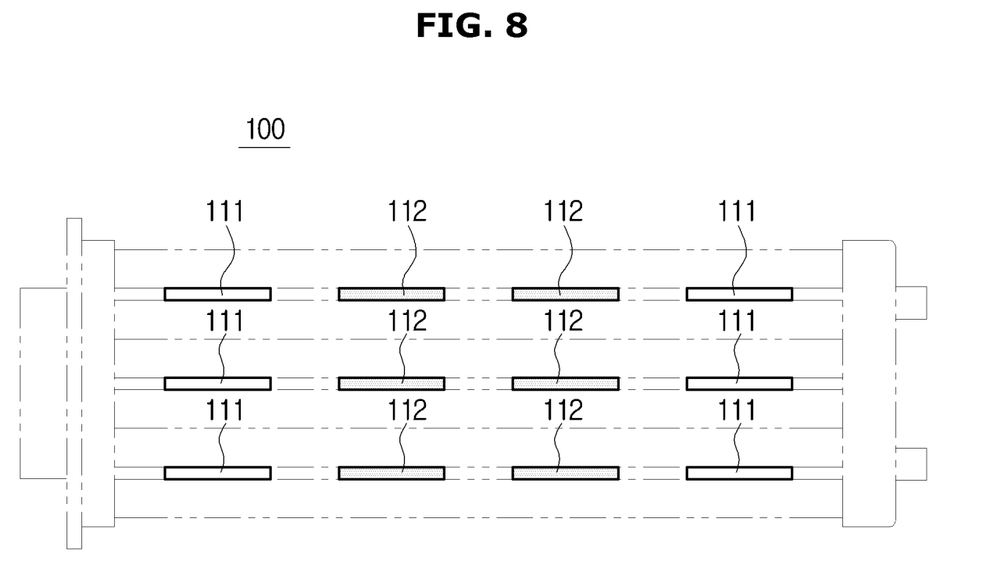
FIG. 8 is a conceptual diagram illustrating the form of FIG. 7.

FIG. 7 is an exploded perspective view illustrating arrangement of PTC elements in a ceramic element in one form of the present disclosure. FIG. 8 is a conceptual diagram illustrating the form of FIG. 7. Hereinafter, FIGS. 7 and 8 will be described to avoid redundant description thereof.

Referring to FIG. 7, the ceramic element 110 may include at least one first PTC element 111 and at least one second PTC element 112 shown in FIG. 6. In the ceramic element 110, the first PTC element 111 may be spaced apart from the second PTC element 112 by a predetermined distance.

In the form disclosed in FIG. 7, the distance between the first PTC element 111 and the front or rear housing 108 or 106 may be different from the distance between the second PTC element 112 and the front or rear housing 108 or 106. In detail, the first PTC element 111 may be arranged at an outer side on the basis of the direction from the rear housing 106 to the front housing 103 or the direction from the front housing 108 to the rear housing 106. The second PTC element 112 may be arranged at an inner side on the basis of the direction from the rear housing 106 to the front housing 103 or the direction from the front housing 108 to the rear housing 106.

That is, the PTC heater 100 may allow the second PTC element 112 to be disposed at a more inner side of the heater as compared to the first PTC element 111. A detailed description thereof will hereinafter be given with reference to FIGS. 9A to 9C.

Meanwhile, the perspective view of FIG. 7 illustrates one example in which the ceramic element 110 mounted to the PTC heater 100 is included. That is, the PTC heater 100 may include a plurality of ceramic elements 110. Each ceramic element 110 may include at least one first PTC element 111 and at least one second PTC element 112.

If the first and second PTC elements 111 and 112 are provided as shown in FIG. 7, the PTC heater 100 provided with three layers composed of the ceramic elements 110 may include the PTC elements 111 and 112 as shown in FIG. 8.

In more detail, the first PTC element may be arranged at an outer side with respect to the housings 106 and 108, and the second PTC element 112 may be arranged at an inner side with respect to the housings 106 and 108. As a result, the PTC heater 100 may further increase the amount of heating power within the inside of the PTC heater 100, such that it may be possible to overcome a limitation in the amount of power of the conventional PTC heater 100 in which the amount of power is restricted by a given region. In addition, the number of used first PTC elements, each of which corresponds to a conventional standard PTC element, can also be reduced.

Figure 9A:
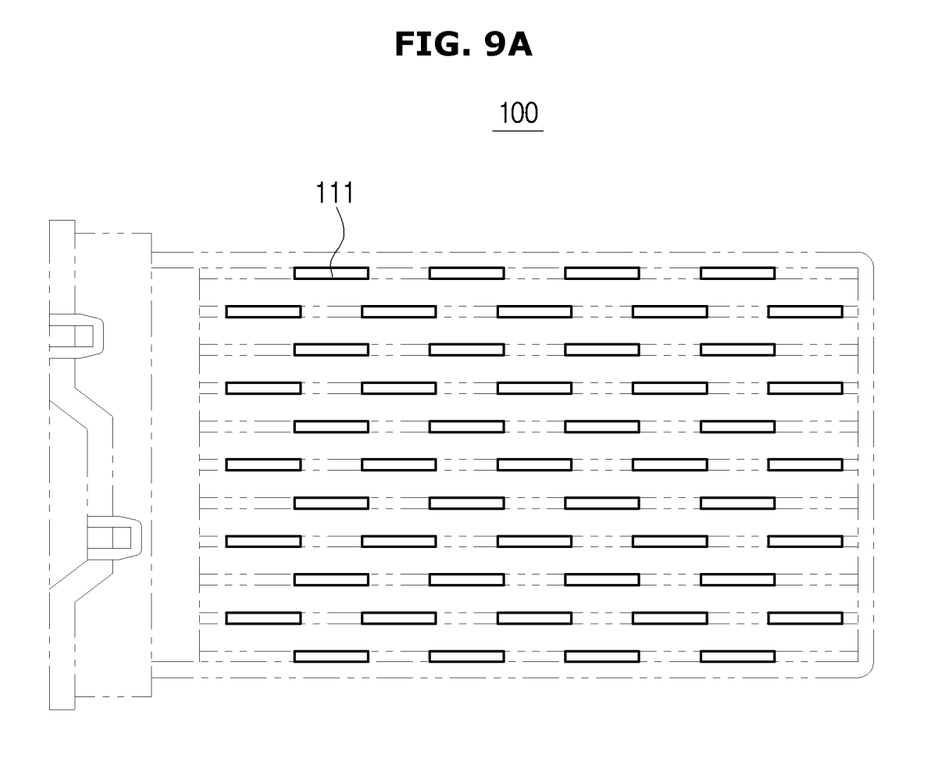
FIGS. 9A to 9C are views illustrating arrangements of PTC elements in another form of the present disclosure.
Figure 9B:
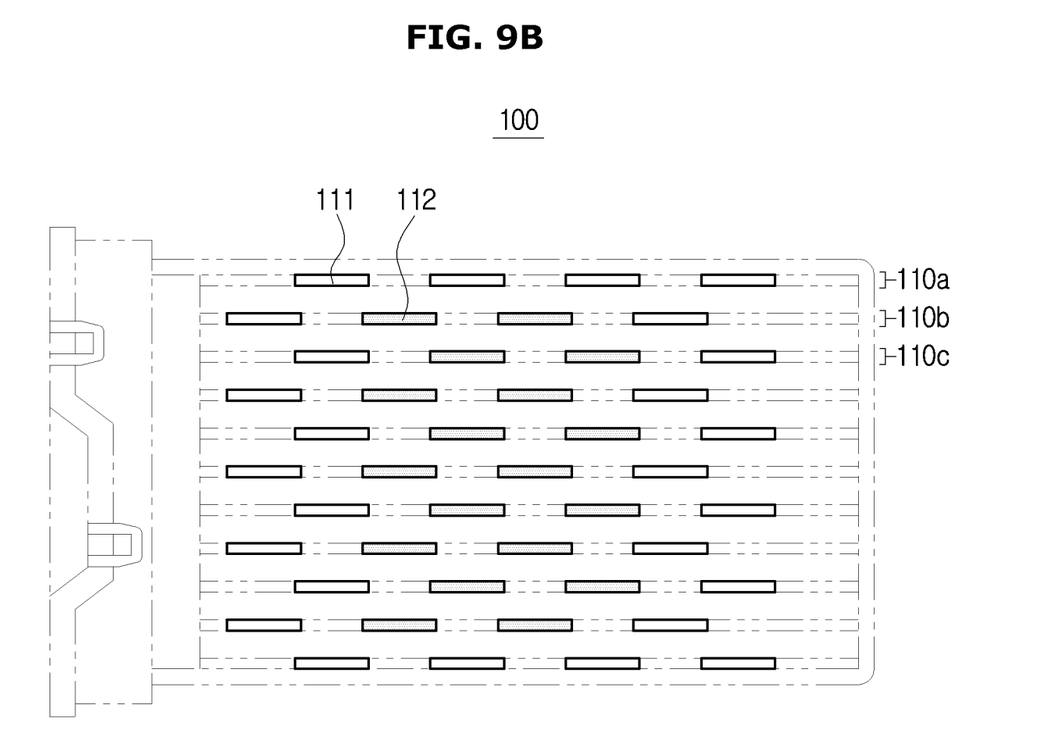
Figure 9C:
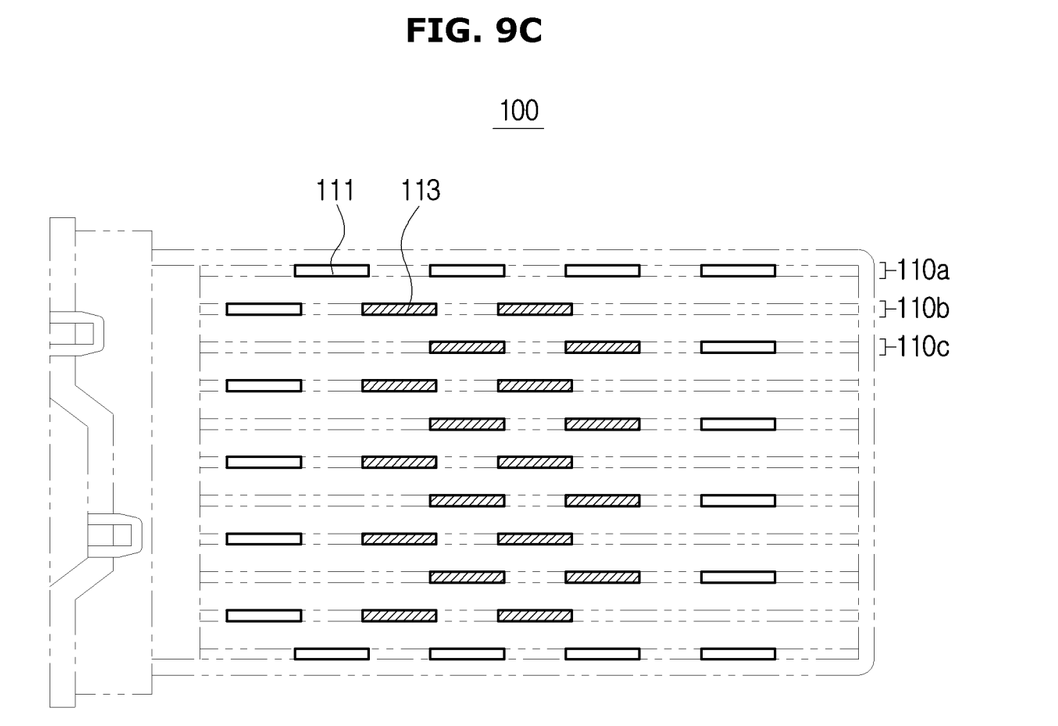

FIGS. 9A to 9C are views illustrating arrangements of PTC elements in another form of the present disclosure. Hereinafter, FIGS. 9A to 9C will be described to avoid redundant description thereof.

Referring to FIG. 9A, the respective first PTC elements 111 for use in a conventional PTC heater may be spaced apart from the ceramic element 110 by a predetermined distance in a batch. In addition, the conventional PTC heater has to implement a plurality of PTC elements using only the first PTC elements 111, resulting in greater inconvenience of use.

Compared with the conventional PTC heater, a PTC heater 100 according to another form of the present disclosure includes at least one first PTC element 111 and at least one second PTC element 112 that are spaced apart from each other by a predetermined distance and are arranged in various ways.

Referring to FIG. 9B, the PTC heater 100 may include 11 layers composed of the ceramic elements 110.

In more detail, as can be seen from FIG. 9B, a first ceramic element 110a of the PTC heater 110 may include four first PTC elements 111. In the second ceramic element 110b, at least one first PTC element 111 may be arranged at the outer side of the front or rear housing 108 or 106 shown in FIG. 7, and the second PTC element 112 may be arranged at an inner side of the front or rear housing 108 or 106 shown in FIG. 7.

Whereas the third ceramic element 110c includes first and second PTC elements 111 and 112 in the same manner as in the second ceramic element 110b, the PTC elements 111 and 112 of the PTC heater 110 according to another form may not be arranged parallel to the PTC elements of the second ceramic element 110b and may be arranged to have a zigzag pattern along with the PTC elements of the second ceramic element 110b.

Meanwhile, the second PTC element 112 mounted to the PTC heater 100 of FIG. 9B may be formed of a material, a heating temperature of which is higher than the first PTC element 111 by about 5° C.~6° C. In this case, a surface temperature of the PTC heater 100 may be approximately 175° C.~180° C.

Referring to FIG. 9C, the PTC heater 100 according to still another form may also include 11 layers composed of the ceramic elements 110.

However, differently from FIG. 9B, the PTC heater 100 of FIG. 9C may include at least one first PTC element 111 and at least one third PTC element 113. The third PTC element 113 may be formed of a material, a heating temperature of which is equal to or higher than approximately 185° C.

However, in order to implement the same target amount of power (e.g., 5000 Watts) in the PTC heater 100 of FIG. 9C, the third PTC element 113 may be arranged in a different way from the PTC heater 100 of FIG. 9B.

That is, as shown in FIG. 9C, the PTC heater 100 according to still another form may be constructed such that only one first PTC element 111 located in the direction of the rear housing 106 is omitted from the second ceramic element 110b. In addition, in order to implement a higher amount of heating power within the PTC heater 110, the first PTC elements 111 may be omitted and arranged in a zigzag pattern.

As a result, the PTC heater 100 can be implemented to have a smaller number of PTC elements than the conventional PTC heater, as well as to have a higher amount of heating power than the conventional PTC heater.

That is, the PTC heater 100 may reduce a total number of PTC elements, such that production costs of the electric heater can be significantly reduced.

As is apparent from the above-mentioned, an electric heater for a vehicle (i.e., an in-vehicle electric heater) and the vehicle including the same according to the forms of the present disclosure may change categories and arrangement of PTC elements in various ways, may generate a maximum amount of power (i.e., increase in heating temperature) within a restricted heating region of the electric heater, and may reduce production costs of the electric heater by reducing the number of standard PTC elements.

Although a few forms of the present disclosure have been shown and described, it would be appreciated by those skilled in the art that changes may be made in these forms without departing from the principles and spirit of the present disclosure.

What is claimed is:

1. An electric heater for a vehicle, the electric heater comprising:
    a first housing;
    a second housing spaced apart from the first housing by a predetermined distance;
    a heat dissipation fin configured to exchange heat with air, disposed between the first housing and the second housing, and supported by the first and second housings; and
    at least one first ceramic element configured to emit heat by receiving a power-supply voltage, disposed between the first housing and the second housing, and supported by the first and second housings,
    wherein the at least one first ceramic element includes:
        a plurality of first positive temperature coefficient (PTC) elements disposed adjacent to side surfaces of the first housing and the second housing, and a second PTC element disposed in a center of the electric heater to increase an amount of heat generated inside the electric heater by the second PTC element,
    wherein the plurality of first PTC elements are standard PTC elements and surround the second PTC element,
    wherein the second PTC element is different from the plurality of first PTC elements,
    wherein the second PTC element has a low resistance value changeable at approximately 25° C. less than a low resistance value of one of the plurality of first PTC elements,
    wherein the second PTC element is configured to emit heat of approximately 175° C. or higher, and
    wherein a heating power of the second PTC element is greater than a heating power of one of the plurality of first PTC elements.

2. The electric heater according to claim 1, further comprising:
    at least one second ceramic element configured to emit heat by receiving the power supply voltage, and including a plurality of first PTC elements.

3. The electric heater according to claim 1, wherein each of the plurality of first PTC elements and the second PTC element has a heating operation temperature that is changeable based on an amount of the air.

4. A vehicle comprising:
    a body; and
    an electric heater configured to heat air of an indoor space of the body,
    wherein the electric heater includes:
        a first housing;
        a second housing spaced apart from the first housing by a predetermined distance;
        a heat dissipation fin configured to exchange heat with air, disposed between the first housing and the second housing, and supported by the first and second housings; and
        at least one first ceramic element configured to emit heat by receiving a power-supply voltage, disposed between the first housing and the second housing, and supported by the first and second housings,
    wherein the at least one first ceramic element includes:
        a plurality of first positive temperature coefficient (PTC) elements disposed adjacent to side surfaces of the first housing and the second housing, and a second PTC element disposed in a center of the electric heater to increase an amount of heat generated inside the electric heater by the second PTC element,
    wherein the plurality of first PTC elements are standard PTC elements and surround the second PTC element,
    wherein the second PTC element is different from the plurality of first PTC elements, wherein the second PTC element has a low resistance value changeable at approximately 25° C. less than a low resistance value of one of the plurality of first PTC elements, wherein the second PTC element is configured to emit heat of approximately 175° C. or higher, and wherein a heating power of the second PTC element is greater than a heating power of one of the plurality of first PTC elements.

5. The vehicle according to claim 4, further comprising:
at least one second ceramic element configured to emit heat by receiving the power supply voltage, and including a plurality of first PTC elements.

6. The vehicle according to claim 4, wherein the at least one first ceramic element includes a plurality of ceramic elements provided at a bottom surface of the heat dissipation fin and supported by the housing.

7. The vehicle according to claim 4, wherein:
the plurality of first PTC elements and the second PTC element are spaced apart from each other by a predetermined distance.

8. The vehicle according to claim 4, wherein each of the plurality of first PTC elements and the second PTC element has a heating operation temperature that is changeable based on an amount of the air.

9. The vehicle according to claim 4, further comprising:
an evaporator configured to exchange heat of the air in the indoor space of the body with a refrigerant; and
a heater core configured to heat air cooled by the evaporator using a coolant of an engine.

10. The vehicle according to claim 4, further comprising:
an outlet through which the air heated by the electric heater is discharged into the indoor space of the body.

11. The vehicle according to claim 4, further comprising:
a rod tube disposed at a bottom surface of the heat dissipation fin;
an insulation material configured to insulate the rod tube and a terminal plate; and
a guide configured to fix a position of the terminal plate.

* * * * *